(12) United States Patent
Du et al.

(10) Patent No.: US 8,344,656 B2
(45) Date of Patent: Jan. 1, 2013

(54) METHODS AND SYSTEMS FOR LED DRIVER HAVING CONSTANT OUTPUT CURRENT

(75) Inventors: Hongyue Du, Shanghai (CN); Xinfeng Liu, Shanghai (CN); Wei Zhang, Shanghai (CN); Jiusheng Zhang, Shanghai (CN); Hongbo Zhang, Shanghai (CN)

(73) Assignee: BCD Semiconductor Manufacturing Limited, George Town (KY)

( * ) Notice: Subject to any disclaimer, the term of this patent is extended or adjusted under 35 U.S.C. 154(b) by 373 days.

(21) Appl. No.: 12/698,829

(22) Filed: Feb. 2, 2010

(65) Prior Publication Data

US 2011/0148324 A1 Jun. 23, 2011

(30) Foreign Application Priority Data

Dec. 21, 2009 (CN) .......................... 2009 1 0260587

(51) Int. Cl.
H05B 37/02 (2006.01)
(52) U.S. Cl. .................... 315/297; 315/224; 315/307
(58) Field of Classification Search ............ 315/209 R, 315/224, 225, 246, 291, 297, 299, 301, 307, 315/308; 323/282
See application file for complete search history.

(56) References Cited

U.S. PATENT DOCUMENTS

| | | | |
|---|---|---|---|
| 6,518,138 B2 | 2/2003 | Hsing | |
| 6,897,643 B2 | 5/2005 | Stone | |
| 7,208,927 B1 | 4/2007 | Nguyen | |
| 7,230,838 B2 | 6/2007 | Xu | |
| 7,378,805 B2 * | 5/2008 | Oh et al. .................... | 315/291 |
| 7,439,720 B2 | 10/2008 | Nguyen et al. | |
| 7,541,750 B2 * | 6/2009 | Shen et al. ................. | 315/291 |
| 7,852,055 B2 * | 12/2010 | Michishita ................. | 323/282 |
| 8,058,812 B2 * | 11/2011 | Negrete ..................... | 315/224 |
| 2006/0220168 A1 | 10/2006 | Hsing | |
| 2007/0279024 A1 | 12/2007 | Falvey et al. | |
| 2009/0096435 A1 | 4/2009 | Ueunten | |
| 2009/0096511 A1 | 4/2009 | Ueunten | |
| 2009/0153127 A1 | 6/2009 | Chen | |
| 2009/0243569 A1 | 10/2009 | Nguyen | |
| 2009/0284237 A1 * | 11/2009 | Kitagawa et al. ............. | 323/282 |
| 2010/0013412 A1 * | 1/2010 | Archibald et al. ............ | 315/294 |

* cited by examiner

*Primary Examiner* — Tung X Le
(74) *Attorney, Agent, or Firm* — Kilpatrick Townsend & Stockton LLP

(57) ABSTRACT

A control circuit for a switched mode power supply includes a transconductance amplifier circuit for receiving a voltage signal related to a current from an input of the power supply and producing a first signal, an analog signal processor coupled to the amplifier circuit for receiving the first signal and a second signal from the input of the power supply and a third signal from an output of the power supply. The analog signal processor is configured to produce a fourth signal as a function of the first, the second, and the third signals. An adder circuit is coupled to the fourth signal and a dimmer control signal, and the adder circuit is configured to output a fifth signal. A comparator circuit is coupled to the adder circuit for providing a control signal to a power transistor that controls current flow in the power supply based on comparison of the fifth signal and a reference signal.

20 Claims, 8 Drawing Sheets

METHODS AND SYSTEMS FOR LED DRIVER HAVING CONSTANT OUTPUT CURRENT

CROSS-REFERENCES TO RELATED APPLICATIONS

This application claims priority to Chinese Patent Application No. 200910260587.9, filed Dec. 21, 2009, by inventors Hongyue Du, et al., commonly assigned and incorporated in its entirety by reference herein for all purposes.

BACKGROUND OF THE INVENTION

Embodiments of the present invention are directed to power supply control circuits and power supply systems and their applications. More particularly, embodiments of the present invention provide methods for systems for controlling a switched mode power supply for providing constant output current in LED light systems.

A DC-DC converter receives a rectified DC voltage and delivers a regulated DC output. DC-DC converters are widely used in white light-emitting diode (LED) drivers or flash LED drivers. Compared with linear regulators, switching mode power supplies have the advantages of smaller size, higher efficiency, and larger output power capability. On the other hand, they also have the disadvantages of greater noise, especially Electromagnetic Interference at the power transistor's switching frequency or its harmonics.

Conventional power supplies of buck-boost topology use current control mode (CCM) or voltage control mode (VCM) loop control that needs internal or outside compensation, which can often cause circuit instability. Compared with the ordinary structure of CCM or VCM switch controller, the architecture described in FIG. 1 tends to be more stable. Such a controller is extensively used in home-lighting, auto-motor, and backlight instruments. In LED lighting systems, the LEDs are often connected in series in the inductor loop.

FIG. 1 is a schematic diagram of an LED lighting system 100 driven by a conventional switching mode power supply. As shown in FIG. 1, lighting system 100 includes serially connected multiple LEDs 104 coupled with a load capacitor 111. The LEDs are driven by a power supply 120, which includes a sense resistor 101, an inductor 102, and a Schottky diode 103. Power supply 120 also includes a controller 130, which includes a transconductance amplifier 105, a Dim linear amplifier 106, a current adder 107, a resistor 108, a comparator 109, and a power MOSFET 110. As shown, transconductance amplifier 105 receives inputs from both ends of sense resistor 101, and power transistor 110 is connected to a node between inductor 102 and Schottky diode 103.

As shown in FIG. 1, power supply 120 receives a rectified DC input voltage Vin. During the charging period, the current from Vin flows through resistor 101 and inductor 102 through power transistor 110 to ground. In this period, energy is stored in inductor 102. The voltage across resistor 101 is sensed by transconductance amplifier 105, which produces an output current $I_1$. Current $I_1$ is fed to resistor 108 through current adder 107, and the resulting voltage is compared with an internal voltage reference Vref. When an internal turn-on reference voltage is reached, the output of comparator 109 drives power MOSFET 110 to switch off through a drive block (not shown). In the discharging period, the energy stored in inductor 102 discharges through diode 103 which, along with capacitor 111, provide a current Iout to LEDs 104. When the sense voltage becomes lower than an internal off reference voltage and detected by comparator 109, power transistor 110 is turned on again, and the charging period is repeated. Controller 130 is capable of boosting input voltage Vin to a higher regulated output voltage Vout.

Even though conventional LED lighting systems, such as system 100 of FIG. 1, can be found in many application, they suffer from many limitations. These limitations include, for example, instability in light output, which may result in flickers.

Therefore, it is desirable to have improved methods and devices for controlling the output current in a power supply in LED lighting and other applications.

BRIEF SUMMARY OF THE INVENTION

Embodiments of the present invention provide methods and systems for a buck-boost pulse width modulation (PWM) power supply. Merely as an example, some embodiments are described in the context of light-emitting diode (LED) driver applications. But it would be recognized that the invention has a much broader range of applicability.

Conventional LED lighting systems such as system 100 shown in FIG. 1, LEDs 104 are driven by current Iout. According to embodiments of the invention, current Iout can vary with input voltage Vin if a conventional controller, such as 130, is used to control the power supply. This variation may lead to changes and instabilities in LED light output, including flickers.

Some embodiments of the invention provide a method and circuit for providing a constant current output in a Buck-Boost topology of power supply system. In a specific embodiment, the input current is sensed at a resistor with an OTA (operation Transconductance Amplifier) converting a voltage drop on the sense resistor to a current. A voltage signal derived from the resistor is compared with a reference voltage in a comparator with hysteresis to drive a switching power MOSFET. In this embodiment, an analog signal processor is used to convert the output of the OTA by a ratio of input voltage plus load voltage of LED over the input voltage $$\left( \text{ratio} = \frac{(Vin + Vload)}{Vin} \right).$$

The output current is substantially insensitive to changes in the input supply voltage. In some embodiments, circuit safety features are also provided, such as over-voltage protection, over-current protection, and over-temperature protection, etc. Thus, accurate output current can be realized using embodiments of the invention.

Various embodiments of the invention provide a stable buck-boost power supply structure that can be used in MR16 LEDs lighting and other applications. The stable output can prevent flicker conditions when LEDs are connected as load elements of an electrical transformer.

In one or more embodiments, an analog signal processor is provided that can perform high speed multiplier/divider operations. In some embodiment, the base-emitter junctions of bipolar transistors are configured for performing the multiplication and division operations of currents and voltages.

According to an embodiment of the present invention, a control circuit for a switched mode power supply includes a transconductance amplifier circuit for receiving a voltage signal related to a current from an input of the power supply and providing a first signal. An analog signal processor is coupled to the amplifier circuit for receiving the first signal and configured to receive a second signal from the input of the power supply and a third signal from an output of the power supply. The analog signal processor is configured to produce a fourth signal as a function of the first, the second, and the third signals. An adder circuit is coupled to the fourth signal and a dimmer control signal, and the adder circuit is configured to output a fifth signal. Moreover, a comparator circuit is coupled to the adder circuit for providing a control signal to a power transistor for controlling current flow in the power supply based on comparison of the fifth signal and a reference signal.

According to another embodiment of the present invention, an LED lighting system includes one or more light emitting diodes (LEDs) connected in series, and a load capacitor coupled in parallel with the one or more LEDs. The LED lighting system also has a switched mode power supply having a control circuit described above. An output terminal of the power supply is coupled to the one or more LEDs for providing a drive current.

According to yet another embodiment, a control circuit for a switched mode power supply includes a transconductance amplifier circuit for receiving a voltage signal related to a current from an input of the power supply and providing a first signal. An analog signal processor is coupled to the amplifier circuit for receiving the first signal and configured to receive a second signal from an output of the power supply. The analog signal processor is configured to produce a third signal as a function of the first and the second signals. An adder circuit is coupled to the third signal and a fourth signal related to an input of the power supply. The adder circuit is configured to output a fifth signal. Moreover, a comparator circuit is coupled to the adder circuit for providing a control signal to a power transistor for controlling current flow in the power supply based on comparison of the fifth signal and a reference signal.

According to still another embodiment of the invention, a control circuit for a switched mode power supply includes an analog signal processor coupled to an input terminal and an output terminal of the power supply. The analog signal processor is configured to receive a first signal related to a current at the input terminal, a second signal related to a voltage at the input terminal, and a third signal related to a voltage at the output terminal. The analog signal processor is also configured to provide a fourth signal related to the first, the second, and the third signal. A comparison circuit is configure for providing a control signal to a power transistor for controlling current flow in the power supply based on comparison between a reference signal with the fourth signal or a fifth signal related to the fourth signal.

In an alternative embodiment of the present invention, an LED lighting system includes one or more light emitting diodes (LEDs) connected in series and a load capacitor coupled in parallel with the one or more LEDs. The LED lighting system also includes a switched mode power supply having a control circuit as described above. An output terminal of the power supply is coupled to the one or more LEDs for providing a drive current.

According to yet another embodiment of the present invention, a switched mode power supply includes an input terminal for receiving a rectified input voltage, an output terminal for providing a regulated output voltage and a regulated output current, a resistor, an inductor, and a diode coupled in series between the input terminal and the output terminal. The power supply also has a first voltage divider coupled to the input terminal and a second voltage divider coupled to the output terminal. The power supply also includes a control circuit that has a power transistor coupled to the inductor and the diode, an amplifier circuit coupled to the resistor for receiving a voltage signal related to a current from an input of the power supply and producing a first signal. The control circuit also has a first signal processing circuit coupled to the amplifier circuit for receiving the first signal and configured to receive a second signal from the input terminal of the power supply and a third signal from an output terminal of the power supply. The first signal processing circuit is configured to produce a fourth signal as a function of the first, the second, and the third signals. The control circuit also has a second signal processing circuit coupled to the first signal processing circuit and configured to output a fifth signal related to the fourth signal. The control circuit further has a comparator circuit coupled to the second signal processing circuit for providing a control signal to the power transistor for controlling current flow in the power supply based on comparison of the fifth signal with a reference signal.

In a specific embodiment of the above power supply, the control signal is configured to enable the power supply to provide a constant current output. In some embodiments, an LED lighting system one or more light emitting diodes (LEDs) connected in series and a load capacitor coupled in parallel with the one or more LEDs. The LED lighting system also has a switched mode power supply as described above, and an output terminal of the power supply being coupled to the one or more LEDs for providing a drive current.

According to another alternative embodiment of the present invention, a signal processing circuit has first, second, third, and fourth bipolar transistors connected in such a way that a sum of the first transistor's base-emitter voltage and the second transistor's base-emitter voltage is equal to a sum of the third transistor's base-emitter voltage and the fourth transistor's base-emitter voltage. The first, second, third, and fourth bipolar transistors are coupled to a first current $I_1$, a second current $I_2$, a third current $I_3$, and a fourth current $I_4$, respectively. The signal processing circuit also has a current mirror for providing an output current that mirrors the fourth current. In a specific embodiment, the first, second, third, and fourth current satisfy the following relationship:

$$I_4 = \frac{I_1 * I_2}{I_3}$$

These and other features and advantages of embodiments of the present invention will be more fully understood and appreciated upon consideration of the detailed description of the preferred implementations of the embodiments, in conjunction with the following drawings.

DETAILED DESCRIPTION OF THE INVENTION

Figure 1:
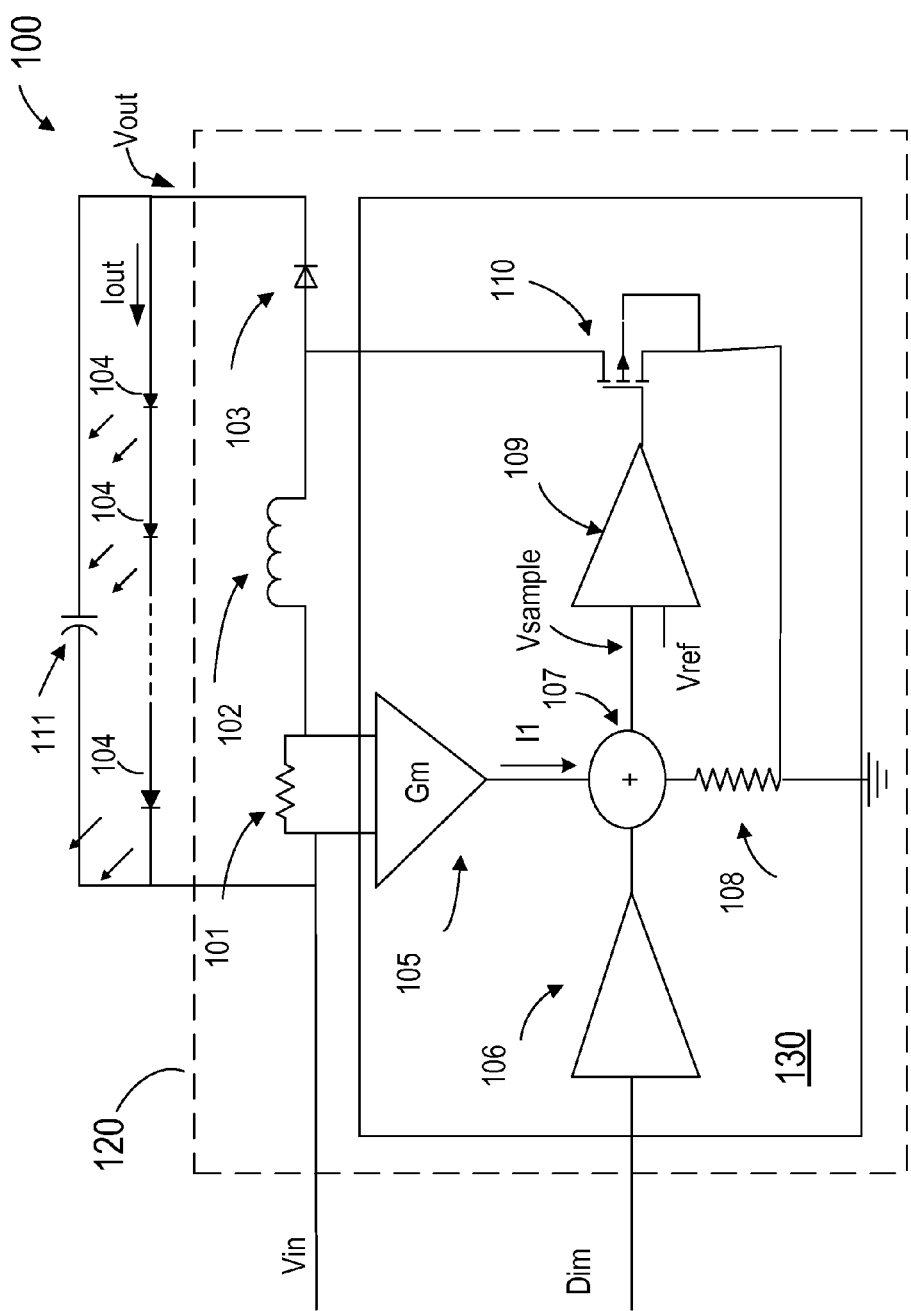
FIG. 1 is a schematic diagram of an LED lighting system 100 driven by a conventional switching mode power supply.

As described above, the output current in conventional LED lighting systems, such as system 100 in FIG. 1 can vary with input voltage Vin, This variation may lead to variations in LED light output, including flickers. Therefore, it is desirable to have improved methods and devices for controlling drive current in a power supply in LED lighting and other applications.

As described in detail below, embodiments of the present invention provide methods and devices for power supplies that can be used as constant current drivers for white light LEDs and other applications.

Figure 2:
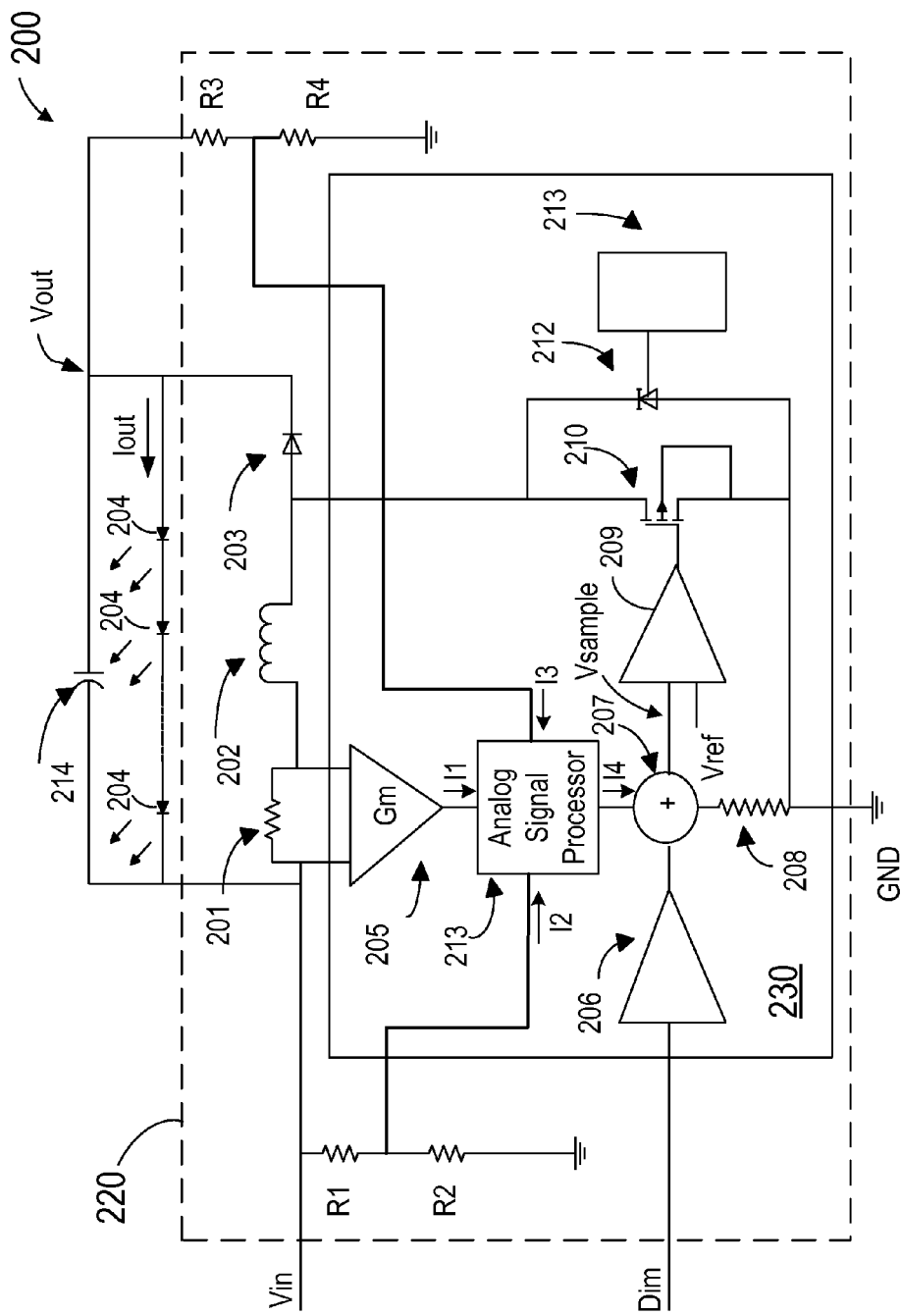
FIG. 2 is a simplified schematic diagram illustrating an LED lighting system driven by a switching mode power supply according to an embodiment of the present invention.

FIG. 2 is a simplified schematic diagram illustrating an LED lighting system 200 driven by a switching mode power supply 220 according to an embodiment of the present invention. As shown in FIG. 2, lighting system 200 includes serially connected multiple LEDs 204 connected with a load capacitor 214. The LEDs are driven by a power supply 220, which includes a sense resistor 201, an inductor 202, and a Schottky diode 203. Power supply 220 also includes a controller 230, which includes a transconductance amplifier 205, a Dim linear amplifier 206, a current adder 207, a resistor 208, a comparator 209, and a power MOSFET 210. As shown, transconductance amplifier 205 receives input from both ends of sense resistor 201, and power transistor 210 is connected to a node between inductor 202 and Schottky diode 203.

As described above, lighting system 200 and power supply 220 have a number of similar components as do light system 100 and power supply 120, respectively. The functions of these common components are not repeated here. It is noted, however, that controller 230 has an analog signal processor 213, which is coupled between transconductance amplifier 205 and current adder 207. Analog signal processor 213 is also coupled to input voltage Vin and output voltage Vout. As described below, analog signal processor 213 is configured to enable the power supply to provide an output current that is substantially independent of Vin.

As shown in FIG. 2, analog signal processor 213 is configured to receive three inputs: $I_1$, $I_2$, and $I_3$, and to produce an output $I_4$ as a function of $I_1$, $I_2$, and $I_3$. $I_1$ is the output from transconductance amplifier 205, $I_2$ is related to Vin through voltage divider R1/R2, and $I_3$ is related to Vin and also related to Vout (also referred to as Vload) through voltage divider R3/R4. As described in more detail below, in some embodiments, $I_4$ can be expressed as a function of $I_1$, $I_2$, and $I_3$:

$$I_4 = \frac{I_1 * I_2}{I_3} \quad (1)$$

In an embodiment, output current Iout of system 200 can be written as an equation of Vin, Vdim, Vload (or Vout), and efficiency η, as follows:

$$I_{out} = K * \frac{V_{dim} * V_{in}}{R_{sense} * (V_{in} + V_{load}) * \eta} \quad (2)$$

where K is a proportionality constant, Rsense is the resistance of resistor 201 in FIG. 2, and Vdim is a voltage at a light adjustment pin DIM which is used to linearly adjust the output current through LEDs. Alternatively, the DIM pin can receive an external DC voltage or a Pulse Width Modulation (PWM) dimming signal for dimming control. As shown, Iout is affected by changes in Vin and Vload. In Eq. 2, efficiency η, may be related to the on-resistance of the power switch, parasitic resistance in the inductor or Schotty diode, or deterioration of various components in the power supply.

Figure 3:
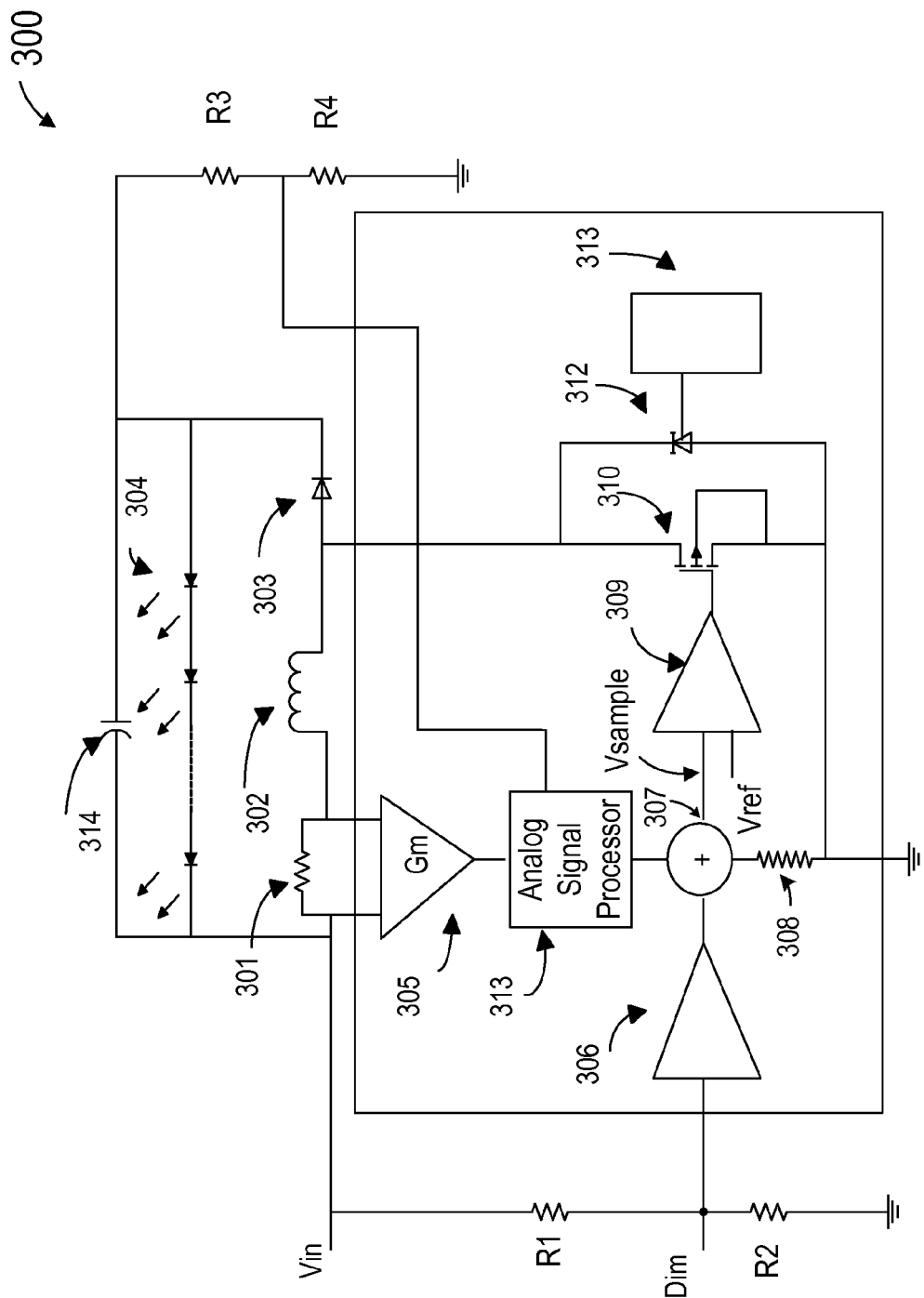
FIG. 3 is a simplified schematic diagram illustrating an LED lighting system driven by a switching mode power supply according to an alternative embodiment of the present invention.

In embodiments of the present invention, the DIM pin is a multi-function On/Off and brightness control pin. In some embodiments, when the Vdim is within a first voltage range, the DIM pin can be used to adjust the brightness of the lighting device. When the Vdim is within a second voltage range, Vdim is not used for the dimming function, and the DIM pin can be coupled to the input (as shown in FIG. 3) and used in controlling the output current in the power supply. Additionally, the DIM pin can also be used in a soft start function.

In the embodiment shown in FIG. 2, where I2 is related to Vin and I3 is related to Vin+Vload, controller 230 is configured such that Iout can be expressed as follows:

$$I_{out} = K1 * K2 * \frac{V_{dim}}{R_{sense} * \eta} \quad (3)$$

where K1 and K2 are constants. It can be seen from Eq. (3) that Iout is not a function of Vin or Vload, when the current relationship described in Eq. (1) is implemented. Thus, a constant output current Iout can be obtained.

In an alternative embodiment, as described below in connection with FIG. 3, when $I_2$ is a constant internal current related to the voltage at DIM through a voltage divider as shown in FIG. 3, Iout can be expressed as follows:

$$I_{out} = K1 * K3 * \frac{1}{R_{sense} * \eta} \quad (4)$$

In equations (3) and (4), η represents the transformation efficiency, $I_1$ represents the transconductance amplifier current, $I_2$ and $I_3$ are related to Vin and Vload (Vout) converter current as shown in FIG. 3. As shown in equations (3) and (4), embodiments of the present invention provides constant output current Iout, which is substantially independent of Vin.

As shown in FIG. 3, another embodiment of the present invention provides an LED driver circuit. As shown, a current adjustment linear amplifier 306 is coupled between resistors R1 and R2 at the input, and signal processor 313 is coupled between resistors R3 and R4 which couple load capacitor 314 to ground. Moreover, signal processor 313 is coupled between transconductance amplifier 305 and current adder 307. That is, current flows from load capacitor 314 and divider resistor R3 and enters signal processor 313, and current from transconductance amplifier 305 also enters signal processor 313. As shown in FIG. 3, $V_{dim}$ adjusts the voltage between two terminals of sampling resistor 301. Therefore, $V_{301} = K_1 \times V_{dim}$.

The operations of LED driver circuits in FIGS. 2 and 3 can be briefly analyzed as follows. In the output of the power supply, $$L \times I = V_{in} \times D \times T$$

where I is the current through inductor 202, and D is the duty cycle for charging and discharging the inductor 202. Moreover, $$L \times I = V_{out} \times T \times (1-D),$$

where I is the inductor current and D is the duty cycle of the charging circuit. Then $$D = \frac{Vout}{(Vin+Vout)}$$

Additionally, $$I_{out} = \frac{\eta * V_{in} * I_{in}}{V_{out} * D}$$

where η is the efficiency of the driver and $$Iin = \frac{V201}{R201}.$$

Substituting in the expression for D, Iout can be expressed as $$Iout = \frac{\eta \times Vin \times V101}{(Vin+Vout) \times R101}.$$

As can be seen, Iout can be kept constant, if $$Vsense = \frac{Vin \times V101}{(Vin+Vout)}$$

is kept constant. In FIG. 2, signal processor 213 is configured to provide such a function.

In FIG. 3, the following relationship holds:

V301=K×Vdim=K1×K2×Vin.

Signal processor 313 is configured such that its output current can be expressed as $$Isensenew = \frac{I301sense \times Iconst}{I_{(Vin+Vout)}}.$$

As described above, $$I_{out} \propto \frac{Vin}{Vin+Vout}.$$

Here, the input to signal processor 313 can be expressed as $$\frac{Vin+Vout}{Vin}.$$

Signal processor 313 is configured to receive V301 and produce an output that is proportional to $$\frac{Vin}{Vin+Vout},$$

then the input to comparator 309 Vsample is also proportional to $$\frac{Vin+Vout}{Vin}.$$

Thus, by maintaining Vsample at a reference voltage using the comparator circuit, a constant output current can be achieved.

In another embodiment, a diode function block 212 is coupled in parallel with power MOS transistor 210 to provide over voltage protection. Although shown as a diode in FIG. 2, diode function block 212 can include a rectifying device and other support circuitry. A detection circuit 213 is coupled to diode block 212. When detection circuit 213 detects an over voltage condition at transistor 210, diode block can shut down transistor 210. Similar features are also included in FIG. 3.

Figure 4A:
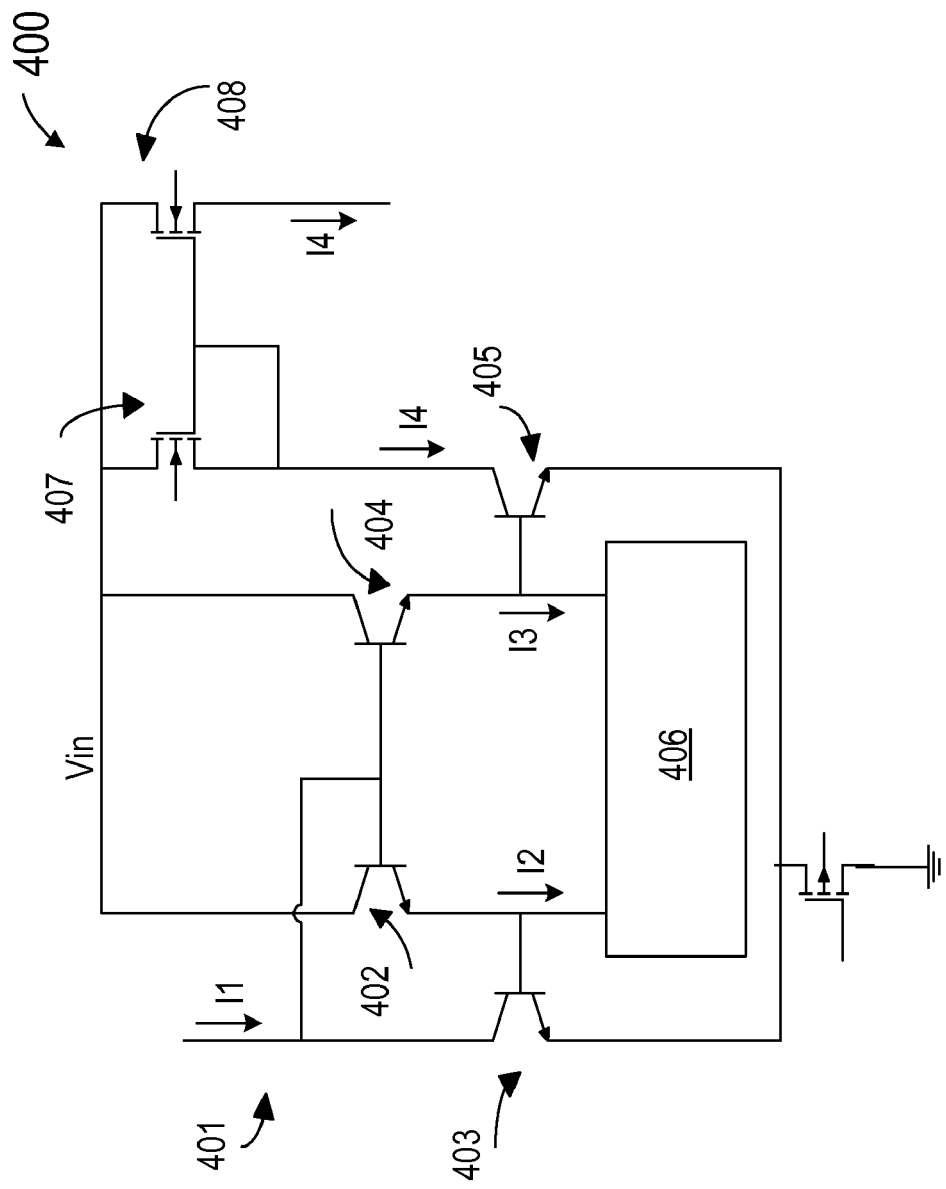
FIGS. 4A-4C are simplified schematic diagrams illustrating an embodiment of the analog signal processor in the power controller of FIGS. 2 and 3.
Figure 4B:
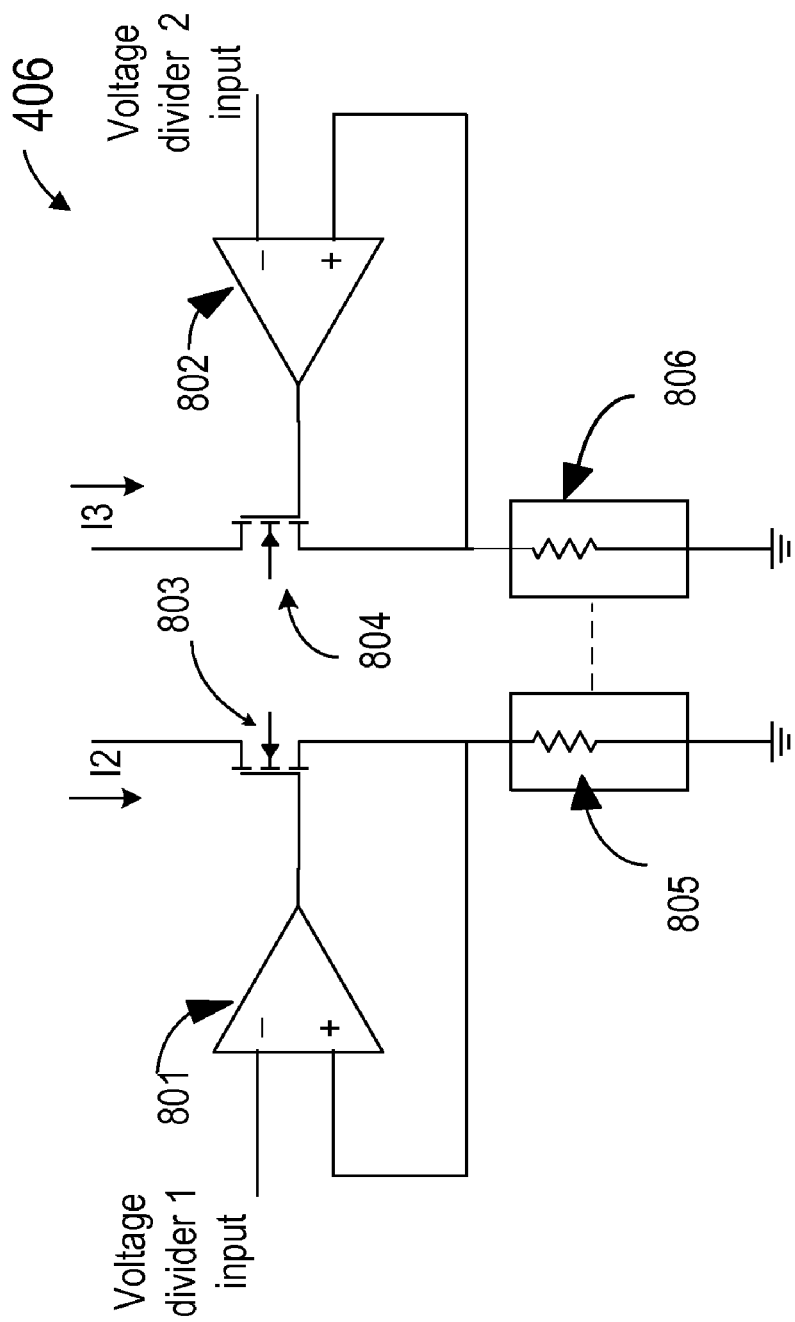
Figure 4C:
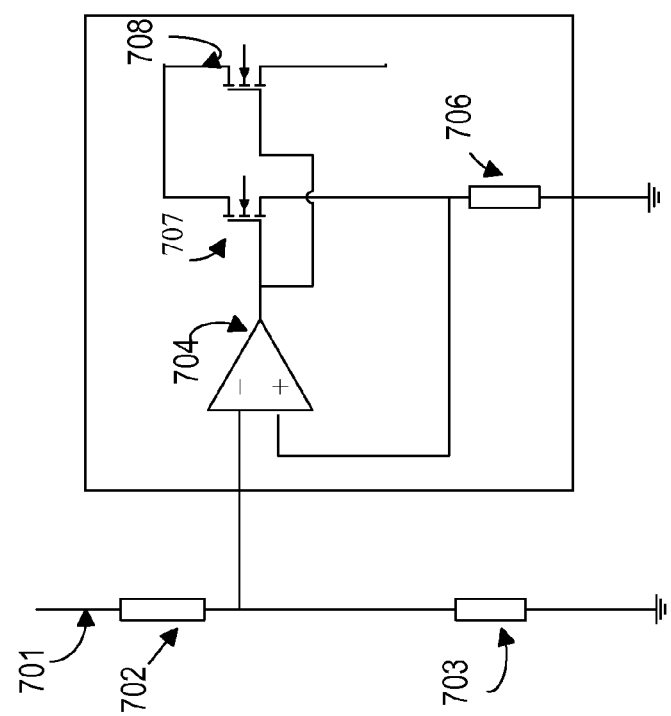

FIGS. 4A-4C are simplified schematic diagrams illustrating an embodiment of analog signal processor 213 in the power controller of FIG. 2. In some embodiments, signal processor 213 includes first, second, third, and fourth bipolar transistors connected in such a way that a sum of the first transistor's base-emitter voltage and the second transistor's base-emitter voltage is equal to a sum of the third transistor's base-emitter voltage and the fourth transistor's base-emitter voltage. The first, second, third, and fourth bipolar transistors are coupled to a first current $I_1$, a second current $I_2$, a third current $I_3$, and a fourth current $I_4$, respectively. A current mirror for providing an output current that mirrors the fourth current. In one or more embodiments, the currents satisfy the following relationship:

$$I_4 = \frac{I_1 * I_2}{I_3}.$$

Several specific embodiments are described below.

FIG. 4A is a simplified circuit diagram of an embodiment of the analog signal processor shown in FIG. 2. In this embodiment, NPN transistors 402, 403, 404, and 405 are interconnected as shown in FIG. 4A. With reference to FIG. 2, $I_1$ is the sense current on sense resistor 201 in FIG. 2, and $I_4$ through transistor 408 is the output current to resistor 208 in FIG. 2. $I_4$ also designates the current flowing through transistor 405 by way of a current mirror.

As configured in FIG. 4A, the base terminals of transistors 402 and 404 are connected, and the emitters of transistors 403 and 405 are connected. It follows that:

$$VBE_{405}=VBE_{402}+VBE_{403}-VBE_{404} \qquad (5)$$

Based on the current-voltage relationship of the base-emitter junction:

$$I_C = I_s * e^{\frac{qV_{BE}}{KV_T}} \qquad (6)$$

the following current relationship is derived: I402*I403=I404*I405. With reference numerals in FIG. 4A, the relationship expressed in Eq. (1) can be obtained.

$$I_4 = \frac{I_1 * I_2}{I_3} \qquad (1)$$

FIG. 4B is a simplified circuit diagram illustrating an embodiment of circuit block 406 in FIG. 4A for voltage to current conversion. As shown, circuit block 406 converts the voltage divider 1 input to current I2 in FIG. 4A, and it also converts voltage divider 2 input to current I3 in FIG. 4A. In FIG. 4B, resistors 805 and 806 are matched to ensure the relationships described in the above equations holds true.

FIG. 4C is a simplified circuit diagram illustrating the connection of part of circuit block 406 in FIG. 4A to a voltage divider. Voltage divider resistors 702 and 703 are used to scale the input voltage at 701 to meet internal voltage requirement. In FIG. 4C, operational amplifier 704, PMOS transistor 707, and resistor 706 form a voltage regulator that maintains the voltage across resistor 706 to be equal to the input voltage to operational amplifier 704. Matching PMOS transistors 708 and 707 provide an output current of the regulator. In the embodiment in FIG. 4B, which includes two voltage-to-current converters described in FIG. 4C, resistors 805 and 806 are matched to ensure proper current relationship. Mismatch of these resistors can cause errors in converting the voltage signals. Additionally, mismatch of transistors 707 and 708, as well as offset in operational amplifier 704, can also lead to signal errors. According to embodiments of the invention, these potential errors can be corrected by using cascode MOS transistors and careful design. Further, another transfer of current can be applied, when a sink current needed. It is also noted that the circuits in FIGS. 4B and 4C can be implemented using MOS transistors provided in a CMOS process.

Figure 5:
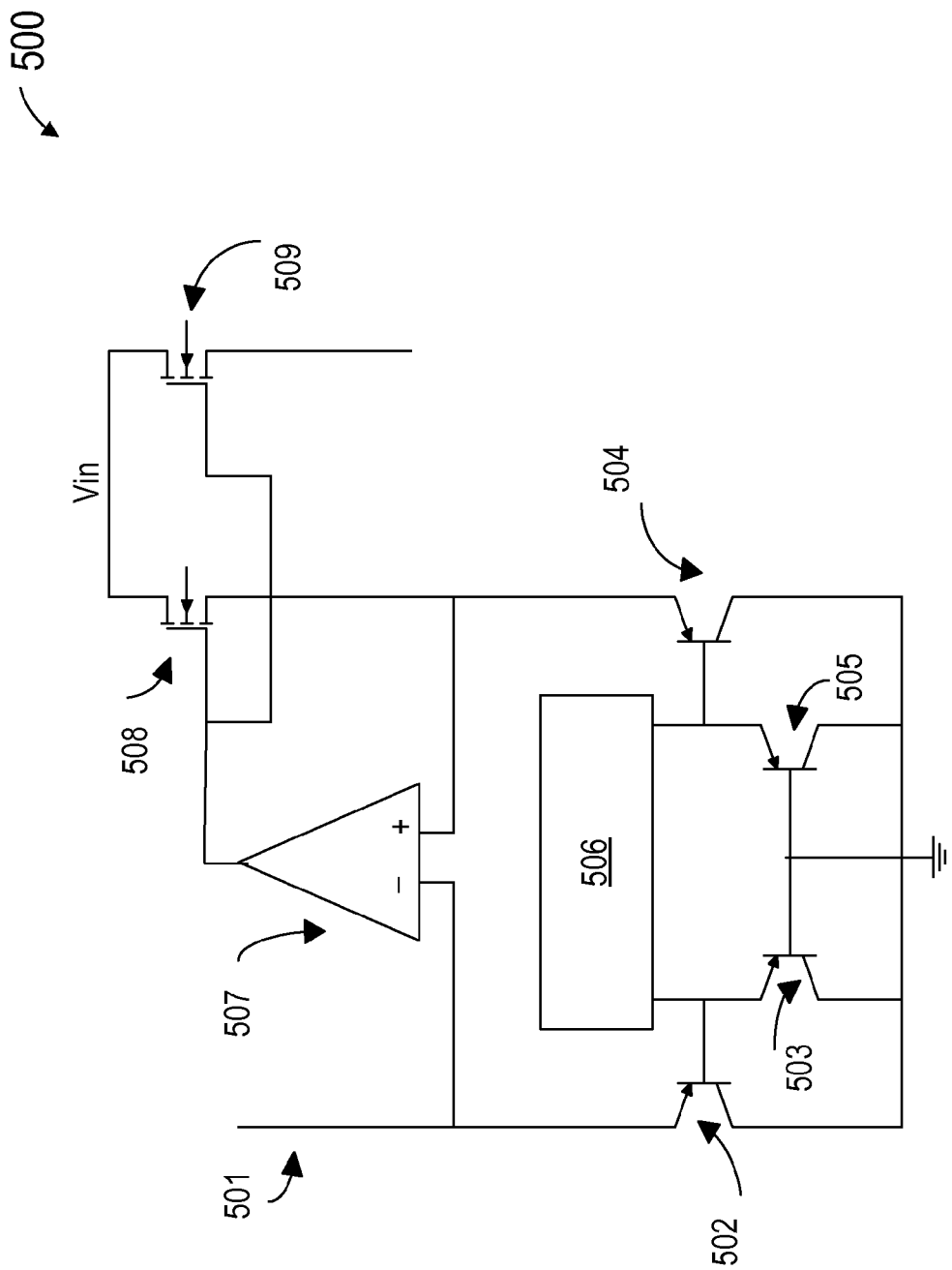
FIG. 5 is a simplified schematic diagram illustrating an alternative embodiment of the analog signal processor in the power controller of FIGS. 2 and 3.

FIG. 5 is a simplified schematic diagram illustrating an alternative embodiment of the analog signal processor in the power controller of FIGS. 2 and 3. In this embodiment, substrate PNP transistors are used, which is compatible with standard CMOS processes. Here, substrate PNP transistor 502, 503, 504, 505 forms a signal processing circuit, substantially similar to the signal processing circuit in FIG. 4A. Operational amplifier 507 and PMOSFET 508 form a current regulator that maintains equal voltages at the two input terminals of 507. As a result, the following relationship is established:

$$VBE_{504} = VBE_{502} + VBE_{503} - VBE_{505} \quad (7)$$

An output current is provided by PMOSFET 509 by matching PMOS 509 with PMOS 508. Alternatively, the output circuit can also be configured using PNP transistors.

Figure 6:
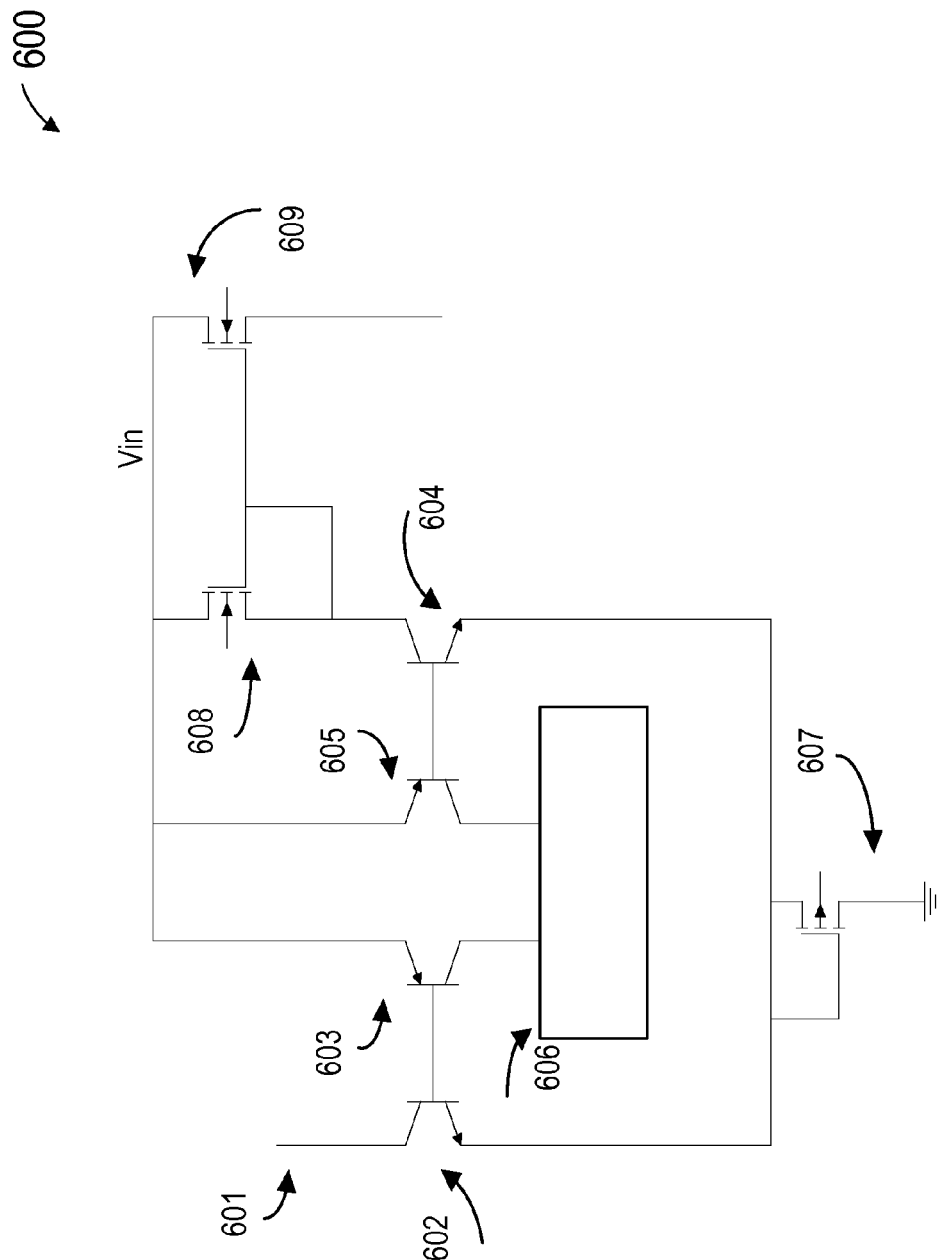
FIG. 6 is a simplified schematic diagram illustrating yet another embodiment of the analog signal processor in the power controller of FIGS. 2 and 3.

FIG. 6 is a simplified schematic diagram illustrating yet another embodiment of the analog signal processor in the power controller of FIGS. 2 and 3. As shown, signal processor 600 includes both NPN and PNP transistors, including NPN transistors 602 and 604 and PNP transistors 603 and 605. The operation of signal processor 600 is substantially similar to that of signal processor 400 in FIG. 4A and signal processor 500 in FIG. 5. The following relationship is established.

$$VBE_{604} = VBE_{602} + VBE_{605} - VBE_{603} \quad (8)$$

In FIG. 6, MOSFET or bipolar transistor 607 is used as a current source and serves to raise the source or emitter voltage and improve the headroom of block 606. Block 606 is receives the divider currents of Vin and Vin plus Vload, similar to the signal processors described above in connection with FIGS. 4A and 4B.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention.

What is claimed is:

1. A control circuit for a switched mode power supply, comprising:

a transconductance amplifier circuit for receiving a voltage signal related to a current from an input of the power supply and providing a first signal;

an analog signal processor coupled to the amplifier circuit for receiving the first signal and configured to receive a second signal from the input of the power supply and a third signal from an output of the power supply, the analog signal processor being configured to produce a fourth signal as a function of the first, the second, and the third signals;

an adder circuit coupled to the fourth signal and a dimmer control signal, the adder circuit configured to output a fifth signal; and a comparator circuit coupled to the adder circuit for providing a control signal to a power transistor for controlling current flow in the power supply based on comparison of the fifth signal and a reference signal.

2. The control circuit as recited in claim 1, wherein the control signal is configured to enable the power supply to provide a constant current output.

3. The control circuit as recited in claim 1, wherein the analog signal processor comprises:

first, second, third, and fourth bipolar transistors connected in such a way that a sum of the first transistor's base-emitter voltage and the second transistor's base-emitter voltage is equal to a sum of the third transistor's base-emitter voltage and the fourth transistor's base-emitter voltage; and a current mirror for providing an output current that mirrors the fourth current.

4. The control circuit as recited in claim 1, wherein the first, second, third, and fourth bipolar transistors are coupled to the first signal, the second signal, the third signal, and the fourth signal, respectively.

5. The control circuit as recited in claim 1, wherein the fourth signal is described by the following expression:

$$I_4 = \frac{I_1 * I_2}{I_3}$$

wherein $I_1$, $I_2$, $I_3$, and $I_4$ are the first, the second, the third, and the fourth signals, respectively.

6. An LED lighting system, comprising:
one or more light emitting diodes (LEDs) connected in series;
a load capacitor coupled in parallel with the one or more LEDs; and
a switched mode power supply having a control circuit as recited in claim 1, an output terminal of said power supply being coupled to the one or more LEDs for providing a drive current.

7. A control circuit for a switched mode power supply, comprising:
an amplifier circuit for receiving a voltage signal related to a current from an input of the power supply and providing a first signal;
an analog signal processor coupled to the amplifier circuit for receiving the first signal and configured to receive a second signal from an output of the power supply, the analog signal processor being configured to produce a third signal as a function of the first and the second signals;
an adder circuit coupled to the third signal and a fourth signal related to an input of the power supply, the adder circuit configured to output a fifth signal; and a comparator circuit coupled to the adder circuit for providing a control signal to a power transistor for controlling current flow in the power supply based on comparison of the fifth signal and a reference signal.

8. The control circuit as recited in claim 7, wherein the control signal is configured to enable the power supply to provide a constant current output.

9. The control circuit as recited in claim 7, wherein the fourth signal is described by the following expression:

$$I_4 = \frac{I_1 * I_2}{I_3}$$

wherein $I_1$, $I_2$, $I_3$, and $I_4$ are the first, the second, the third, and the fourth signals, respectively.

10. A control circuit for a switched mode power supply, comprising:
an analog signal processor coupled to an input terminal and an output terminal of the power supply, the analog signal processor being configured to receive:
a first signal related to a current at the input terminal,
a second signal related to a voltage at the input terminal, and
a third signal related to a voltage at the output terminal, the analog signal processor also being configured to provide a fourth signal related to the first, the second, and the third signal; and
a comparison circuit configure for providing a control signal to a power transistor for controlling current flow in the power supply based on comparison between a reference signal with the fourth signal or a fifth signal related to the fourth signal.

11. The control circuit as recited in claim 10, wherein the control signal is configured to enable the power supply to provide a constant current output.

12. The control circuit as recited in claim 10, wherein the analog signal processor comprises first, second, third, and fourth bipolar transistors connected in such a way that a sum of the first transistor's base-emitter voltage and the second transistor's base-emitter voltage is equal to a sum of the third transistor's base-emitter voltage and the fourth transistor's base-emitter voltage,; and
a current mirror for providing an output current that mirrors the fourth current.

13. The control circuit as recited in claim 10, wherein the fourth signal is described by the following expression:

$$I_4 = \frac{I_1 * I_2}{I_3}$$

wherein $I_1$, $I_2$, $I_3$, and $I_4$ are the first, the second, the third, and the fourth signals, respectively.

14. An LED lighting system, comprising:
one or more light emitting diodes (LEDs) connected in series;
a load capacitor coupled in parallel with the one or more LEDs; and
a switched mode power supply having a control circuit as recited in claim 10, an output terminal of said power supply being coupled to the one or more LEDs for providing a drive current.

15. A switched mode power supply, comprising:
an input terminal for receiving a rectified input voltage;
an output terminal for providing a regulated output voltage and a regulated output current;
a resistor, an inductor, and a diode coupled in series between the input terminal and the output terminal;
a first voltage divider coupled to the input terminal;
a second voltage divider coupled to the output terminal;
a control circuit, including:
a power transistor coupled to the inductor and the diode;
an amplifier circuit coupled to the resistor for receiving a voltage signal related to a current from an input of the power supply and producing a first signal;
a first signal processing circuit coupled to the amplifier circuit for receiving the first signal and configured to receive a second signal from the input terminal of the power supply and a third signal from an output terminal of the power supply, the first signal processing circuit being configured to produce a fourth signal as a function of the first, the second, and the third signals;
a second signal processing circuit coupled to the first signal processing circuit and configured to output a fifth signal related to the fourth signal; and
a comparator circuit coupled to the second signal processing circuit for providing a control signal to the power transistor for controlling current flow in the power supply based on comparison of the fifth signal with a reference signal.

16. The power supply as recited in claim 15, wherein the control signal is configured to enable the power supply to provide a constant current output.

17. The power supply as recited in claim 15, wherein the fourth signal is described by the following expression:

$$I_4 = \frac{I_1 * I_2}{I_3}$$

wherein $I_1$, $I_2$, $I_3$, and $I_4$ are the first, the second, the third, and the fourth signals, respectively.

18. The power supply as recited in claim 15, wherein the first signal processing circuit comprises a transconductance amplifier.

19. The power supply as recited in claim 15, wherein the second signal processing circuit comprises resistor.

20. An LED lighting system, comprising:
one or more light emitting diodes (LEDs) connected in series;
a load capacitor coupled in parallel with the one or more LEDs; and
a switched mode power supply as recited in claim 15, an output terminal of said power supply being coupled to the one or more LEDs for providing a drive current.

* * * * *